(12) United States Patent
Ohtaka et al.

(10) Patent No.: US 11,581,683 B2
(45) Date of Patent: Feb. 14, 2023

(54) CONNECTOR WITH GROMMET

(71) Applicant: Yazaki Corporation, Tokyo (JP)

(72) Inventors: Kazuto Ohtaka, Shizuoka (JP); Jun Ishikawa, Tokyo (JP)

(73) Assignee: YAZAKI CORPORATION, Tokyo (JP)

( * ) Notice: Subject to any disclaimer, the term of this patent is extended or adjusted under 35 U.S.C. 154(b) by 483 days.

(21) Appl. No.: 16/850,079

(22) Filed: Apr. 16, 2020

(65) Prior Publication Data
US 2020/0335912 A1 Oct. 22, 2020

(30) Foreign Application Priority Data
Apr. 18, 2019 (JP) .............................. JP2019-079209

(51) Int. Cl.
*H01R 13/641* (2006.01)
*F16F 1/373* (2006.01)
*F16B 5/00* (2006.01)

(52) U.S. Cl.
CPC ......... *H01R 13/641* (2013.01); *F16F 1/3735* (2013.01); *F16B 5/0088* (2013.01)

(58) Field of Classification Search
CPC .............................. H01R 13/641; F16F 1/3735
See application file for complete search history.

(56) References Cited

U.S. PATENT DOCUMENTS

| 5,545,061 A * | 8/1996 | Sawayanagi ......... H01R 13/743 439/752 |
| 9,774,129 B2 * | 9/2017 | Kikuchi ............... H01R 13/743 |
| 11,211,752 B2 * | 12/2021 | Ohtaka ................ H01R 13/641 |
| 2004/0242063 A1 * | 12/2004 | Miyamoto ........... H01R 13/743 439/557 |
| 2017/0062970 A1 | 3/2017 | Kikuchi |
| 2017/0201038 A1 | 7/2017 | Watai et al. |
| 2018/0248316 A1 * | 8/2018 | Matsuura ........... H01R 13/5202 |

FOREIGN PATENT DOCUMENTS

| CN | 107017514 A | 8/2017 |
| JP | 2015-222667 A | 12/2015 |

* cited by examiner

*Primary Examiner* — Tho D Ta
(74) *Attorney, Agent, or Firm* — Sughrue Mion, PLLC

(57) ABSTRACT

A connector with a grommet includes a housing and a grommet. A panel hooking portion, a flange, and a locking projection are formed on an outside of the housing. The grommet includes a panel contact part that comes into tight contact with an edge of a mounting hole of a panel. A flexible arm is formed on the flange so as to protrude from the flange. The locking projection is provided at a front of the flexible arm. A sensing part configured to sense whether the locking projection is locked to the panel, is provided at a rear of the flexible arm so as to protrude outward than the flange. The sensing part is received in a receiving part formed on the panel contact part. When the locking projection is not locked to the panel, the sensing part and the receiving part tilt.

4 Claims, 18 Drawing Sheets

RELEASE DIRECTION

CONNECTOR WITH GROMMET

CROSS-REFERENCE TO RELATED APPLICATION

The present application is based on, and claims priority from Japanese Patent Application No. 2019-079209, filed on Apr. 18, 2019, the entire contents of which are incorporated herein by reference.

TECHNICAL FIELD

The disclosure relates to a connector with a grommet.

BACKGROUND

A connector with a grommet to be attached to a panel of an automobile is disclosed in, for example, JP 2015-222667 A.

The connector with a grommet includes a connector housing (housing) and a grommet configured to cover an outer circumference of the connector housing. When a lock projection (locking projection) of the connector housing is located in a mounting hole of a vehicle body panel (panel), a sensing piece of the connector housing tilts and presses a thin part of the grommet. Accordingly, the thin part of the grommet bulges.

SUMMARY

However, even if the sensing piece of the housing tilts, the sensing piece is covered with the thin part of the grommet, so that the thin part of the grommet bulges only slightly.

For this reason, it is difficult to visually confirm the bulging of the thin part, and an operator needs to make sure the bulging of the thin part by touching the grommet with a hand. In the case of a narrow work space, it is also difficult for the operator to touch the grommet with the hand to confirm the bulging of the thin part.

In order to solve the above-mentioned problem, it is an object of the disclosure to provide a connector with a grommet that allows visual confirmation of a half-locked state in which a locking projection of a housing is not locked to a panel, easily and reliably.

According to an embodiment, there is provided a connector with a grommet including: a housing including a panel hooking portion that is hooked on an edge of a mounting hole of a panel and is locked to the edge, an annular flange that faces the edge, and a locking projection that is locked to the panel by sandwiching the panel between the locking projection and the flange, wherein the panel hooking portion, the flange, and the locking projection are formed on an outside of the housing; and a grommet including a panel contact part that is fitted into the flange so as to cover the flange and comes into tight contact with the edge, wherein a flexible arm extending forward is formed on the flange so as to protrude from the flange, the locking projection is provided at a front of the flexible arm, a sensing part configured to sense whether the locking projection is locked to the panel, is provided at a rear of the flexible arm so as to protrude outward than the flange, the sensing part is received in a receiving part formed on the panel contact part, and the sensing part and the receiving part tilt when the locking projection is not locked to the panel.

According to the embodiment, since the sensing part and the receiving part of the grommet configured to receive the sensing part tilt together, the fact that the locking projection of the housing is not locked to the panel can be visually confirmed, easily and reliably.

DETAILED DESCRIPTION

Hereinafter, an embodiment of the disclosure will be described with reference to the drawings.

One embodiment of the disclosure will be described with reference to FIGS. 1 to 22.

Figure 1:
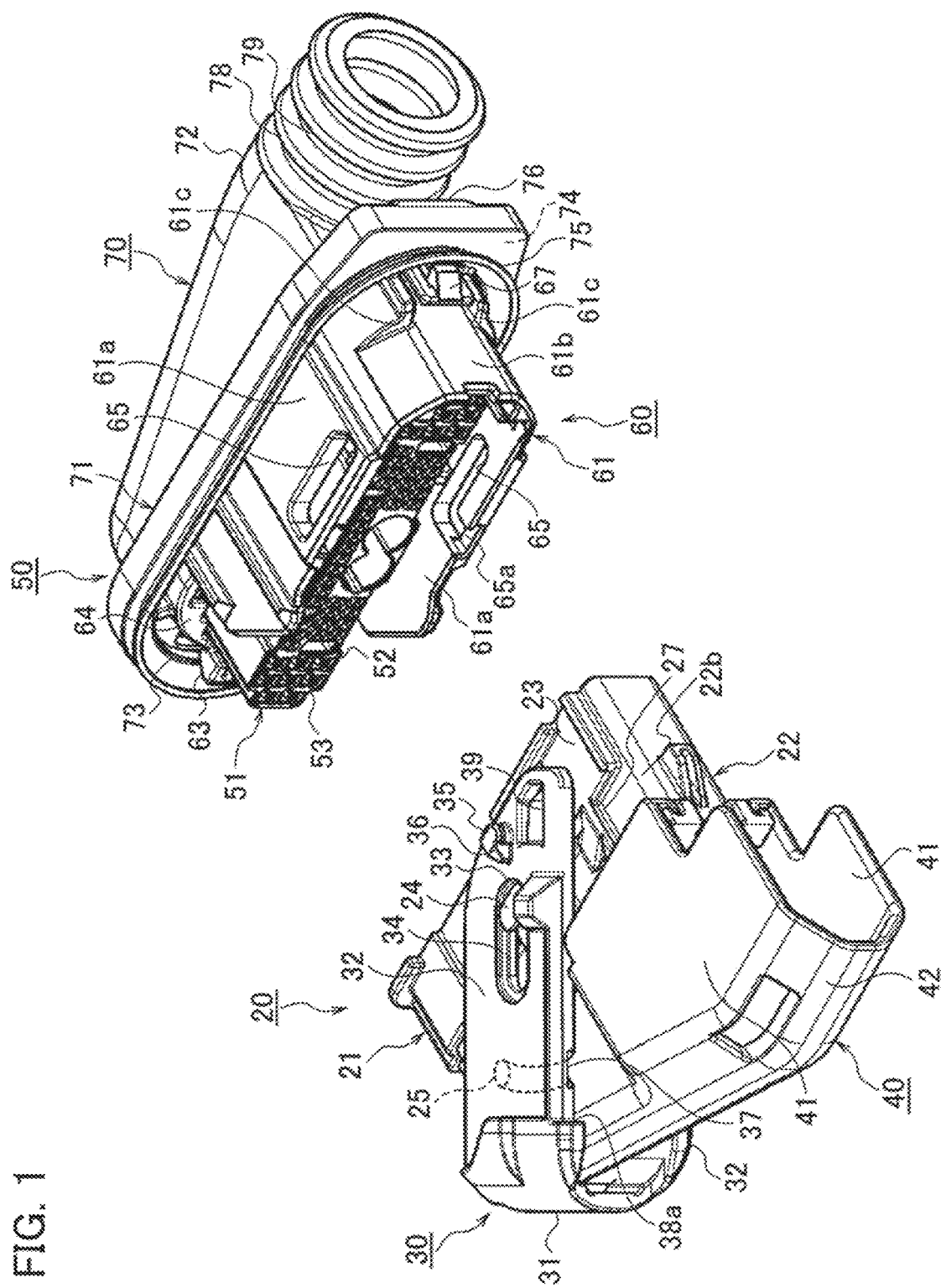
FIG. 1 is a perspective view illustrating a state before fitting of a lever-type connector according to an embodiment of the disclosure.
Figure 19:
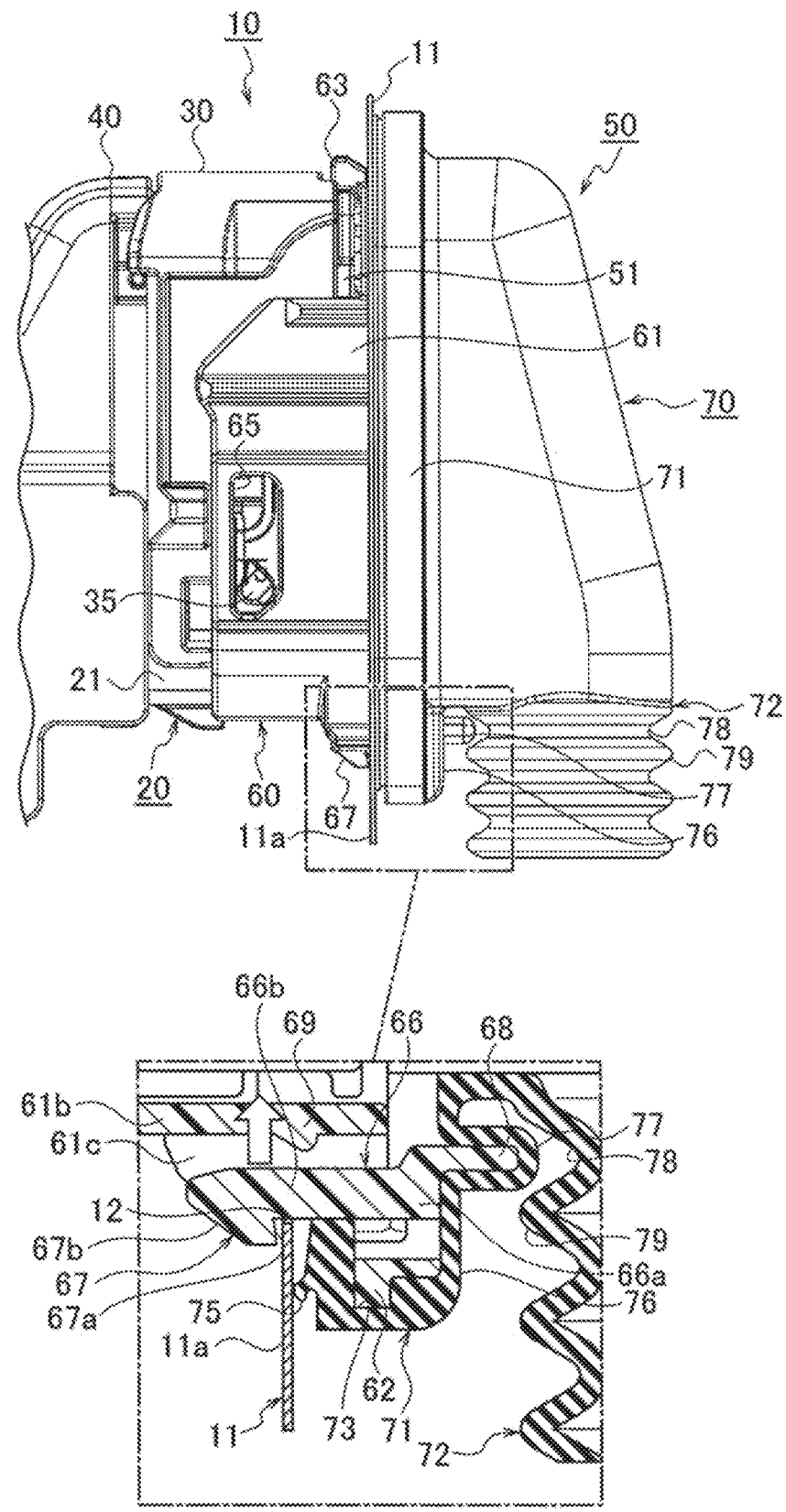
FIG. 19 is a side view illustrating a state in which a locking projection of the lever-type connector is locked to the vehicle body panel and assembled.

As illustrated in FIGS. 1 and 19, a lever-type connector 10 includes a male connector 20 and a female connector (connector with a grommet) 50. The male connector 20 is arranged on an inside of a vehicle body panel (panel) 11 (a side opposite to a door side). The female connector 50 is arranged on an outside of the vehicle body panel 11 (door side).

Figure 4:
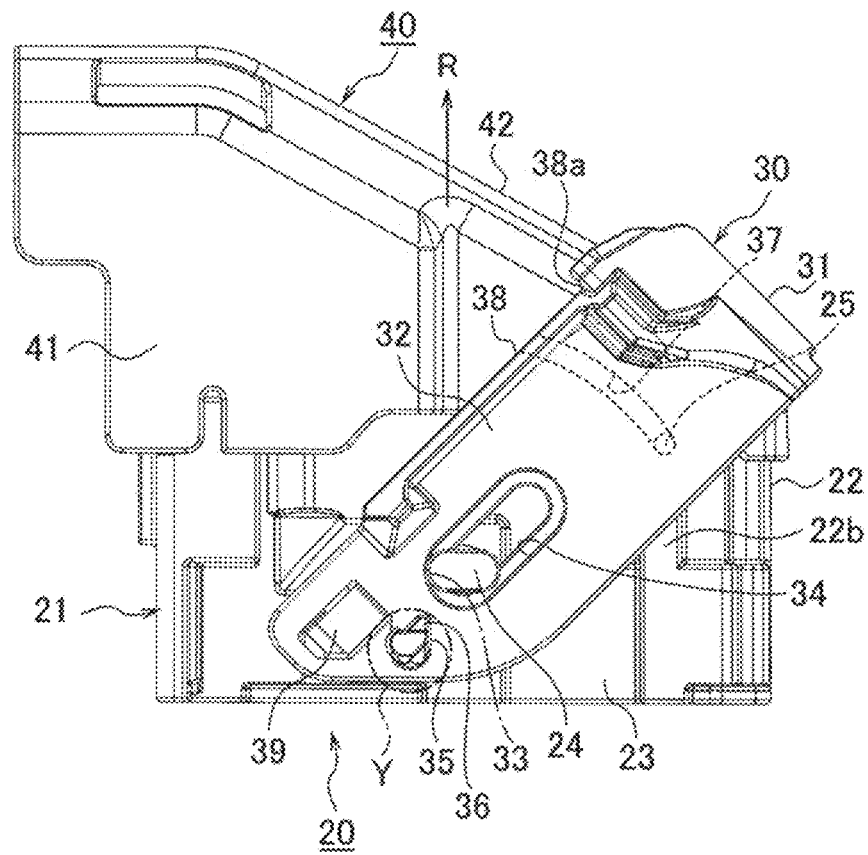
FIG. 4 is a side view of the male connector when a temporary setting is released.
Figure 6:
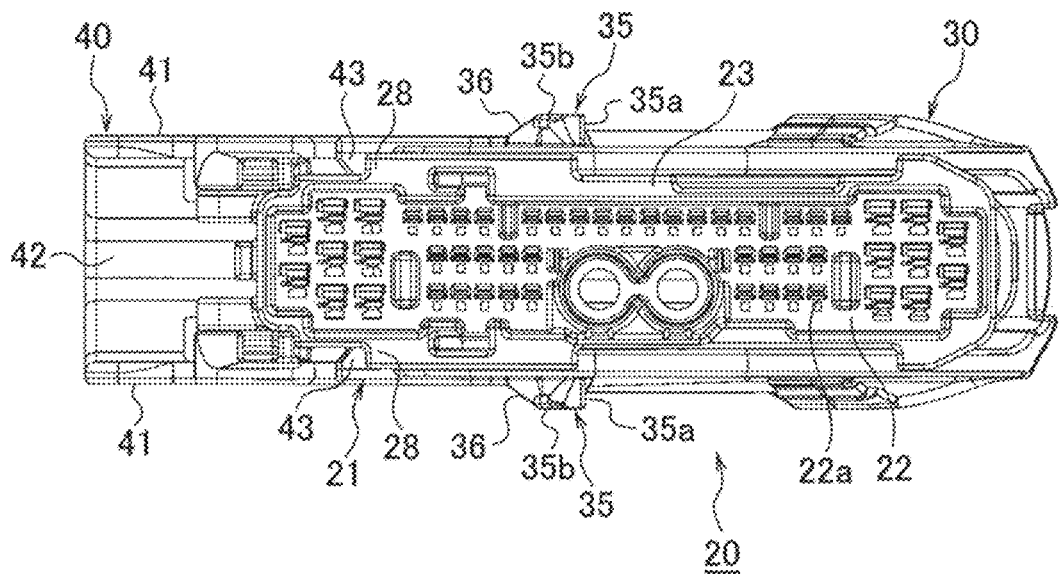
FIG. 6 is a bottom view of the male connector when the temporary setting is released.
Figure 7:
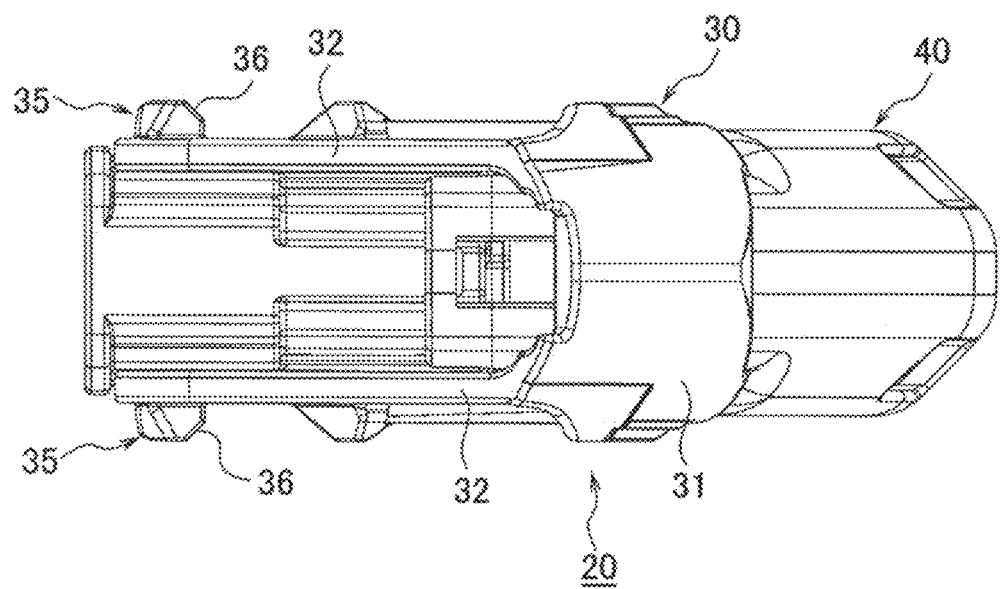
FIG. 7 is a plan view of the male connector when the temporary setting is released.

As illustrated in FIGS. 1, 4, and 6, the male connector 20 includes a male housing 21 made of a synthetic resin, a lever 30 made of a synthetic resin and a cable cover 40 made of a synthetic resin. The male housing 21 houses a plurality of male terminals (terminals), not illustrated, and is fitted into and disengaged from a female housing 51 of the female connector 50. The lever 30 is pivotably supported and slidably supported by the male housing 21 via support shafts 24 and 24 (only one support shaft 24 is illustrated in FIGS. 1 and 4). The lever 30 fits and disengages the male housing 21 and the female housing 51 by a pivoting operation. The cable cover 40 is mounted on the male housing 21 so as to cover a rear side of the male housing 21 (a side opposite to a side where the male connector 20 faces the female connector 50).

Figure 2:
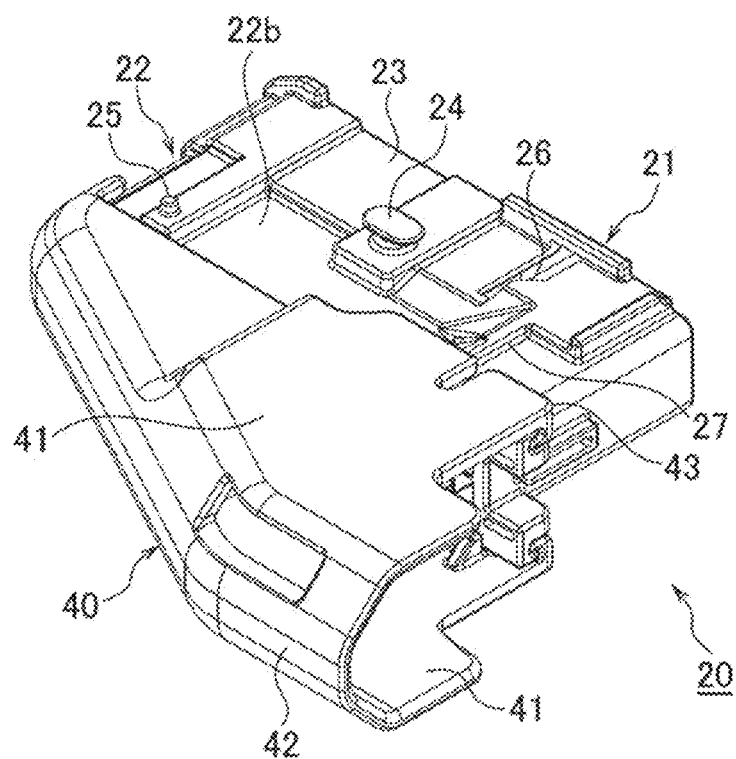
FIG. 2 is a perspective view of a male connector of the lever-type connector.

As illustrated in FIGS. 1, 2, and 6, the male housing 21 includes a housing body 22 having a rectangular block shape and a hood portion 23. The housing body 22 includes a plurality of terminal receiving holes 22a which receives male terminals. The hood portion 23 is formed integrally on the front side of the housing body 22 (the side where the male connector 20 faces the female connector 50) so as to protrude therefrom. A housing body 52 of the female housing 51 is fitted into the hood portion 23. The support shafts 24 and 24 extending in a direction perpendicular to a fitting direction of the connector are integrally formed so as to respectively protrude from boundaries between centers of side surfaces 22b and 22b on both sides of the housing body 22 and the hood portion 23. The support shafts 24 and 24 are pivot shafts of the lever 30.

Guide projections 25 and 25 are integrally formed on the rear side of side surfaces 22b and 22b on both sides of the housing body 22 (the side opposite to the side where the male connector 20 faces the female connector 50) so as to protrude therefrom, and at a position near an operation portion 31 of the lever 30, described later. As illustrated in FIG. 2, temporary locking recesses (temporary locked portions) 26 and 26 and final locking recesses (final locked portions) 27 and 27 are respectively formed on the hood portion 23 and the side surfaces 22b and 22b on both sides of the housing body 22, at positions corresponding to trajectories of the pivots of projecting portions 39a and 39a of locking arms (locking portions) 39 and 39 of the lever 30, described later (only one temporary locking recess 26 and one final locking recess 27 are illustrated in FIG. 2).

Figure 3:
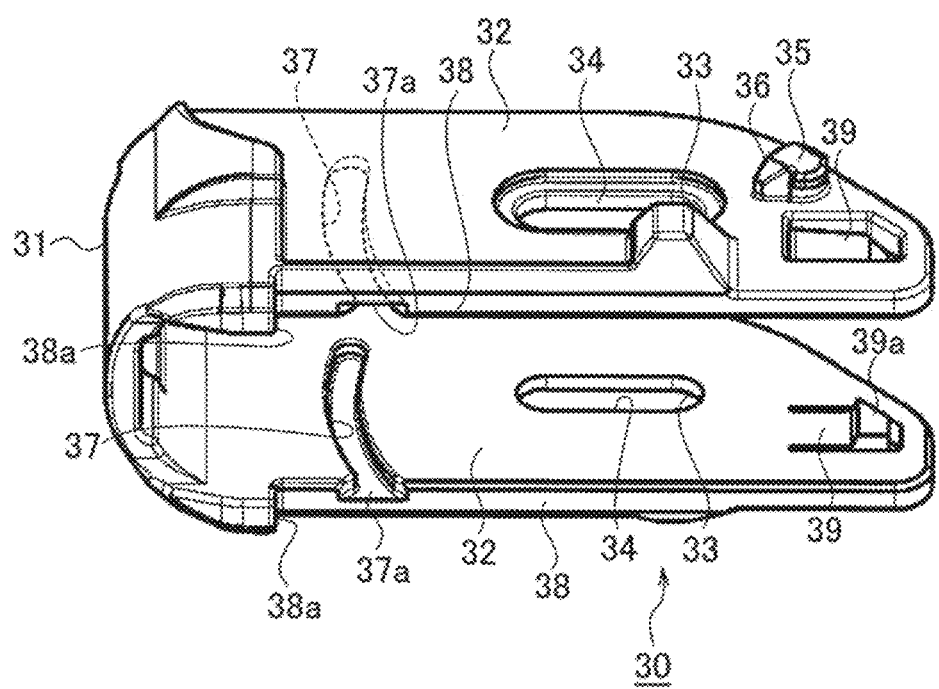
FIG. 3 is a perspective view of a lever of the lever-type connector.

As illustrated in FIGS. 1, 3, and 4, the lever 30 is mounted on the male housing 21 so as to cover a part of the male housing 21 of the male connector 20 and a part of the cable cover 40. The lever 30 pulls the male connector 20 and the female connector 50 toward each other by the pivoting operation from a lever pivot start position illustrated in FIG. 13A to a lever pivot completion position illustrated in FIG. 14A, to fit the male connector 20 and the female connector 50. The lever 30 includes the operation portion 31 and a pair of arm portions 32 and 32 extending from both sides of the operation portion 31.

As illustrated in FIGS. 1, 3, and 4, a bearing hole (bearing portion) 33 is formed at a center of each arm portion 32 of the lever 30. The bearing hole 33 includes a shaft sliding groove 34 in which the support shaft 24 slides. A column-shaped cam boss 35 is integrally formed so as to protrude from each arm portion 32.

Figure 5:
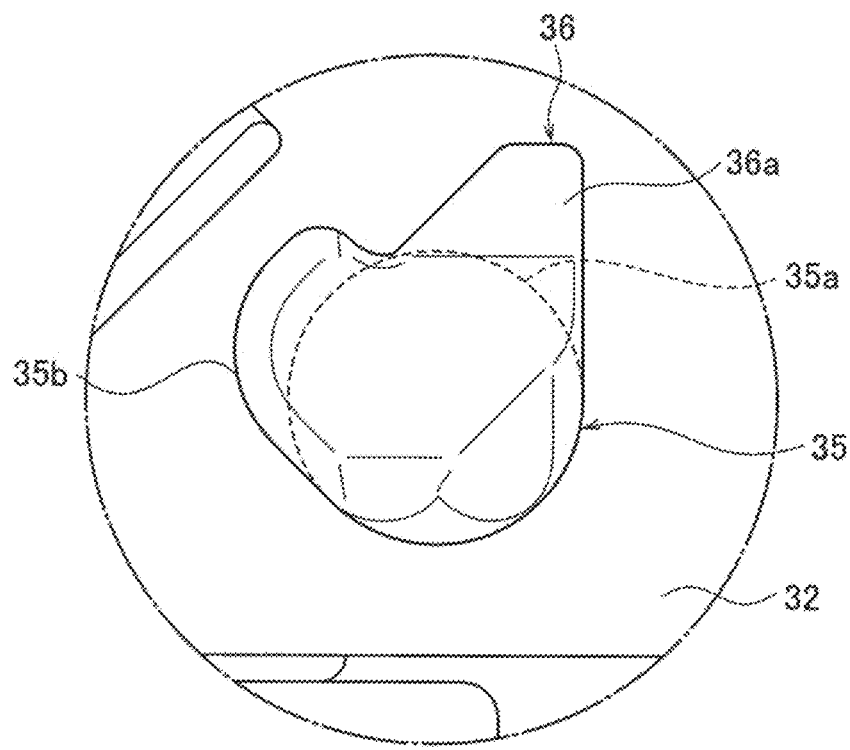
FIG. 5 is an enlarged view of a part Y in FIG. 4.
Figure 13A:
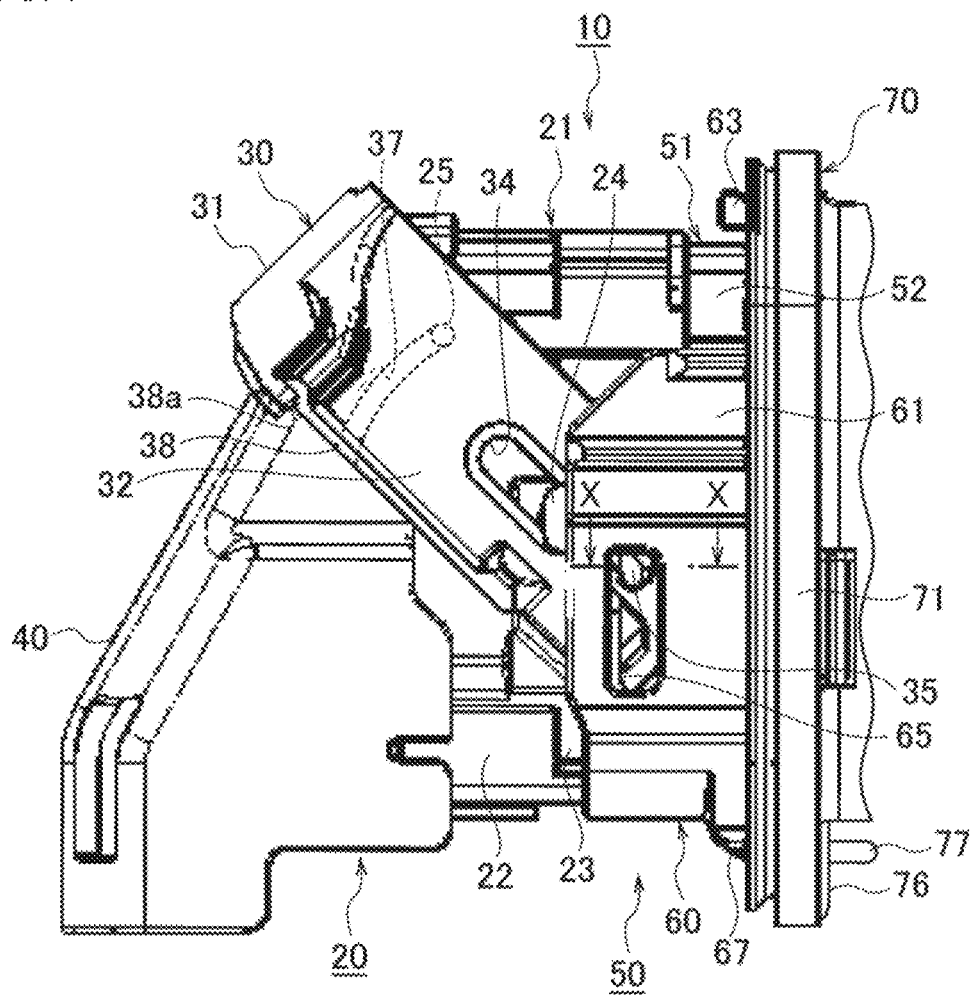
FIG. 13A is a side view illustrating the lever-type connector in a temporary setting state at a start of lever pivot.
Figure 13B:
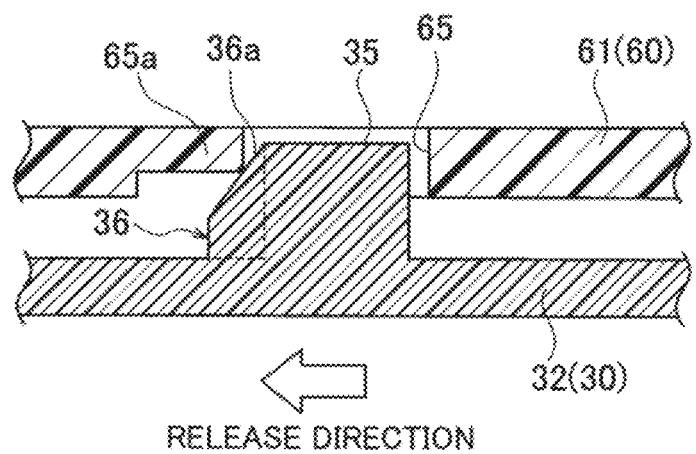
FIG. 13B is a cross-sectional view taken along a line X-X in FIG. 13A.
Figure 14A:
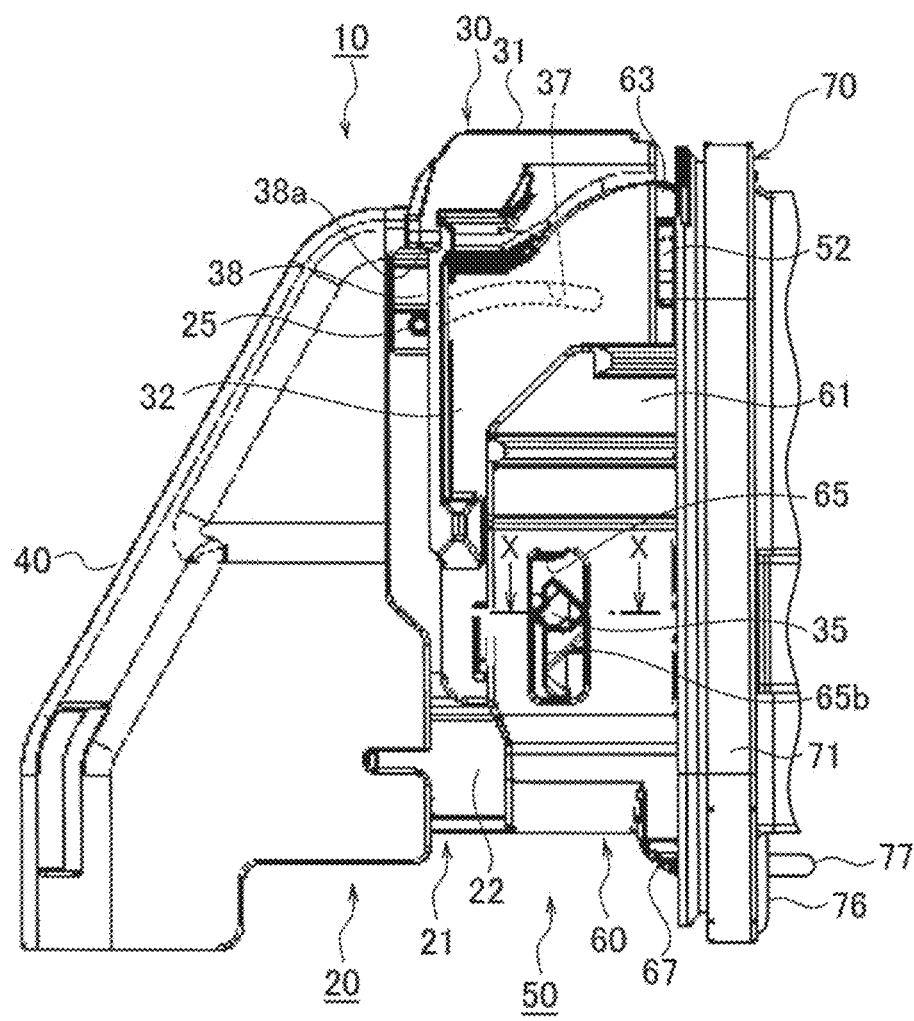
FIG. 14A is a side view illustrating the lever-type connector in a state at completion of the lever pivot.
Figure 14B:
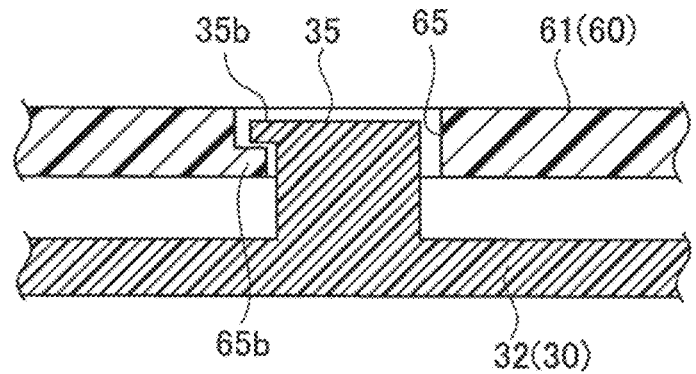
FIG. 14B is a schematic cross-sectional view taken along a line X-X in FIG. 14A.

As illustrated in FIGS. 4 to 7 and FIG. 13B, a projection 36 having a tapered portion 36a is integrally formed on an outside of the cam boss 35 in the temporary setting release direction (direction of disengagement of the connector) R so as to protrude therefrom. When the male connector 20 and the female connector 50 are fitted, the tapered portion 36a obliquely opposes a surface of a temporary locking projection 65a of a cam groove 65, described later, on the side of the temporary setting release direction R. Further, as illustrated in FIGS. 5 and 14B, a position control rib 35b that engages with a draw-in rib 65b of the cam groove 65 is integrally formed so as to protrude from the upper end of a shaft portion 35a of the cam boss 35.

As illustrated in FIG. 3, an arc-shaped guide groove 37 with which the guide projection 25 engages, is formed between the operation portion 31 and the bearing hole 33 in each arm portion 32. The guide groove 37 is formed in an elongated arc shape centering on the bearing hole 33. On the open-end side of the guide groove 37, a pickup taper 37a for guiding the guide projection 25 is formed.

Figure 15:
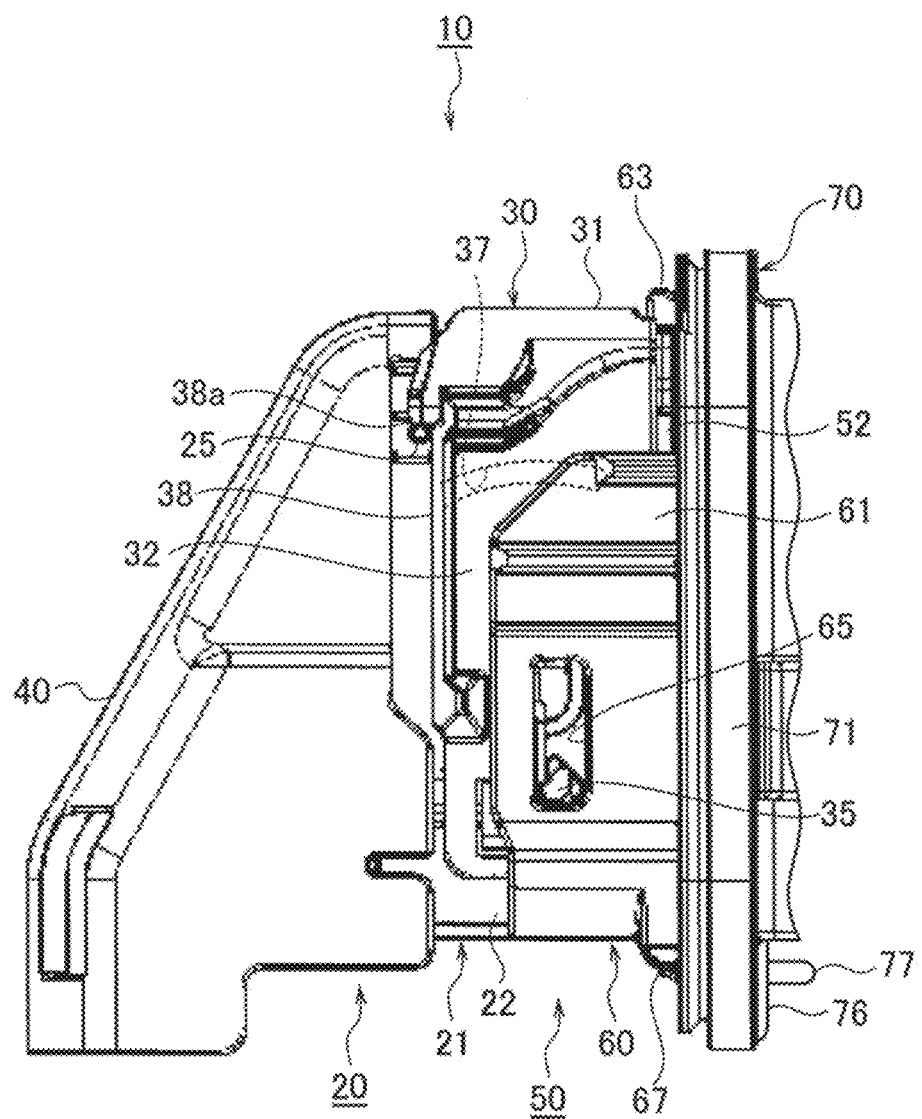
FIG. 15 is a side view illustrating a state in which sliding of the lever of the lever-type connector is completed.

As illustrated in FIG. 3, each arm portion 32 of the lever 30 is provided with a sliding portion 38 on which the guide projection 25 slides in the sliding direction after the pivot of the lever 30. The sliding portion 38 is formed in a rail shape with a concave inside. Further, each arm portion 32 is provided with a contact part 38a with which the guide projection 25 contacts at the end of the slide after the pivot of the lever 30. The guide projection 25 slides in the guide groove 37 by the pivoting operation of the lever 30, and after the male connector 20 and the female connector 50 are completely fitted, the guide projection 25 moves along the sliding portion 38 until the guide projection 25 butts the contact part 38a. With such a configuration, the lever 30 can slide with respect to the housing body 22 of the male housing 21, as illustrated in FIGS. 14A and 15.

As illustrated in FIGS. 1 and 3, the locking arm (locking portion) 39 that is resiliently deformed in a direction perpendicular to the fitting direction of the housings, is formed on an outside of the distal end of each arm portion 32 of the lever 30. The projecting portion 39a of the locking arm 39 is locked in and released from the temporary locking recess 26 or the final locking recess 27. With such a configuration, the locking arm 39 serves to lock and release the lever 30 with respect to the temporary locking recess 26 or the final locking recess 27.

As illustrated in FIGS. 1 and 2, the cable cover 40 includes a pair of side walls 41 and 41 forming an opening, and a curved and bent ceiling wall 42. As illustrated in FIG. 6, when the cable cover 40 is slid and mounted on the rear end side of the housing body 22 of the male housing 21 (an end on the side opposite to the side where the male connector 20 faces the female connector 50), lock portions 43 formed at the lower ends of the side walls 41 and 41 are locked to locked portions 28 formed in the housing body 22.

As illustrated in FIG. 1, the female connector 50 with a grommet includes the female housing 51 and a rubber grommet 70. The female housing 51 includes a plurality of terminal housing chambers 53 configured to house female terminals (terminals), not illustrated. The female housing 51 includes a housing body 52 made of a synthetic resin and a cylindrical frame 60 made of a synthetic resin. The housing body 52 is fitted into and disengaged from the male housing 21 of the male connector 20. The frame 60 is fitted on the outer circumference of the housing body 52 to form an exterior and is locked in a mounting hole 12 of the vehicle body panel 11. The grommet 70 is mounted on a flange 62 of the frame 60.

As illustrated in FIG. 1, the housing body 52 includes the plurality of terminal housing chambers 53 configured to house the female terminals and is formed into a rectangular block shape. At positions on both sides of the housing body 52 facing the temporary locking recesses 26 and 26 formed on the side surfaces 22b and 22b on both sides of the male housing 21, release projections (release parts), not illustrated, configured to release a temporary locking state between the projecting portions 39a and 39a of the locking arms 39 and 39 of the lever 30 and the temporary locking recesses 26 and 26, are formed respectively.

Figure 8:
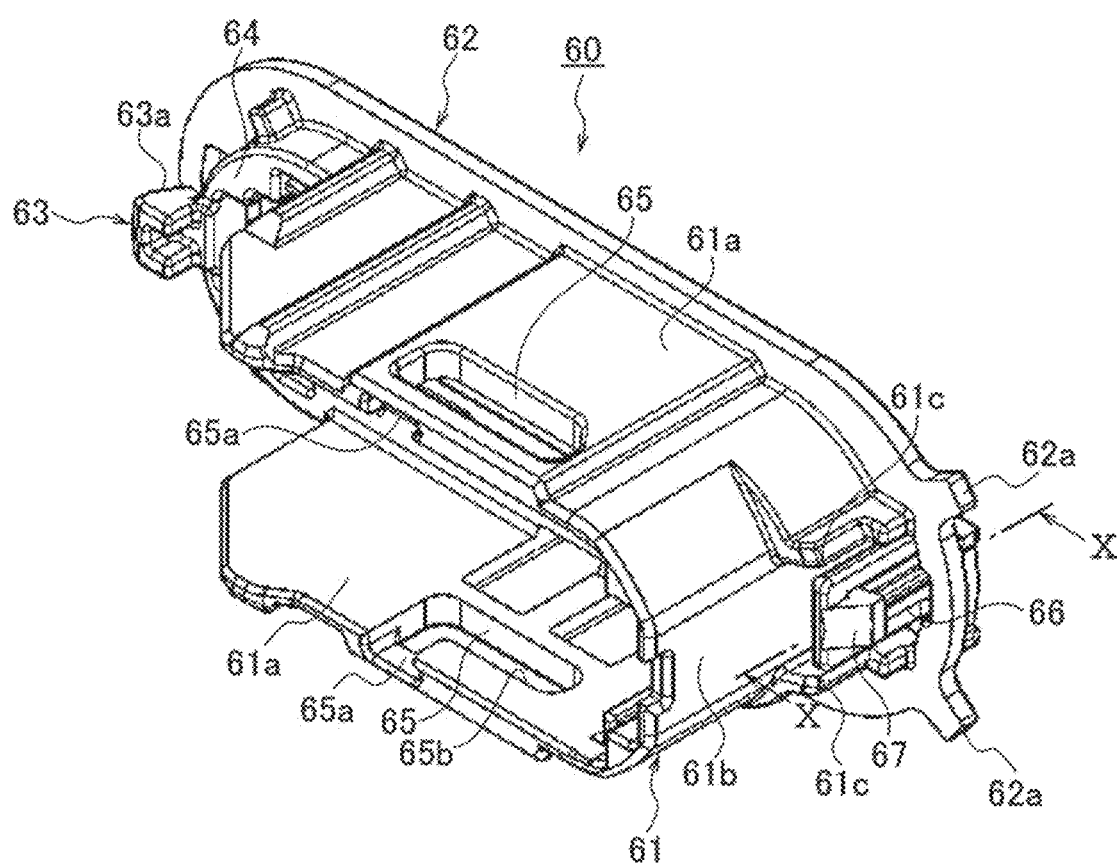
FIG. 8 is a perspective view of a frame of a female connector of the lever-type connector.

As illustrated in FIG. 8, the frame 60 includes a frame body 61 having a cylindrical shape notched on an upper surface, and the flange 62 having an annular plate-shape. The flange 62 is formed so as to integrally protrude outward from the entire circumference on one end of the frame body 61. The flange 62 faces an edge 12a of the mounting hole 12 of the vehicle body panel 11 when the female connector 50 is mounted on the vehicle body panel 11.

A panel hooking portion 63 which is hooked on the edge 12a and locked to the edge 12a of the mounting hole 12, is provided on an upper side of the frame body 61. By pivoting the female housing 51 with the panel hooking portion 63 as a fulcrum in a state where the panel hooking portion 63 is hooked on the edge 12a of the mounting hole 12, a locking projection 67, described later, can be locked in the mounting hole 12. Note that a pickup taper 63a is formed on the panel hooking portion 63 on a side where the flange 62 is located.

As illustrated in FIGS. 1 and 8, a locking frame portion 64 is provided below the panel hooking portion 63 of the frame body 61. The locking frame portion 64 locks the housing body 52 of the female housing 51 provided inside side walls 61a and 61a on both sides of the frame body 61 with a gap. A pair of abutting portions 61c and 61c are provided on both sides of a bottom wall 61b of the frame body 61. The abutting portions 61c and 61c butt the vehicle body panel 11 when the locking projection 67, described later, is not properly locked in the mounting hole 12 of the vehicle body panel 11. The hood portion 23 of the housing body 22 of the male housing 21 is fitted between the housing body 52 of the female housing 51 and the cylindrical frame body 61 of the frame 60. A pair of projecting portions 62a and 62a are formed on an outside of the flange 62 integrally with the flange 62 of the frame 60 at positions facing the abutting portions 61c and 61c so as to protrude from the flange 62. The projecting portions 62a and 62a are inserted into a deep groove portion 74 formed at the back of a flange fitting groove 73 of the grommet 70, described later, without penetration.

Figure 9:
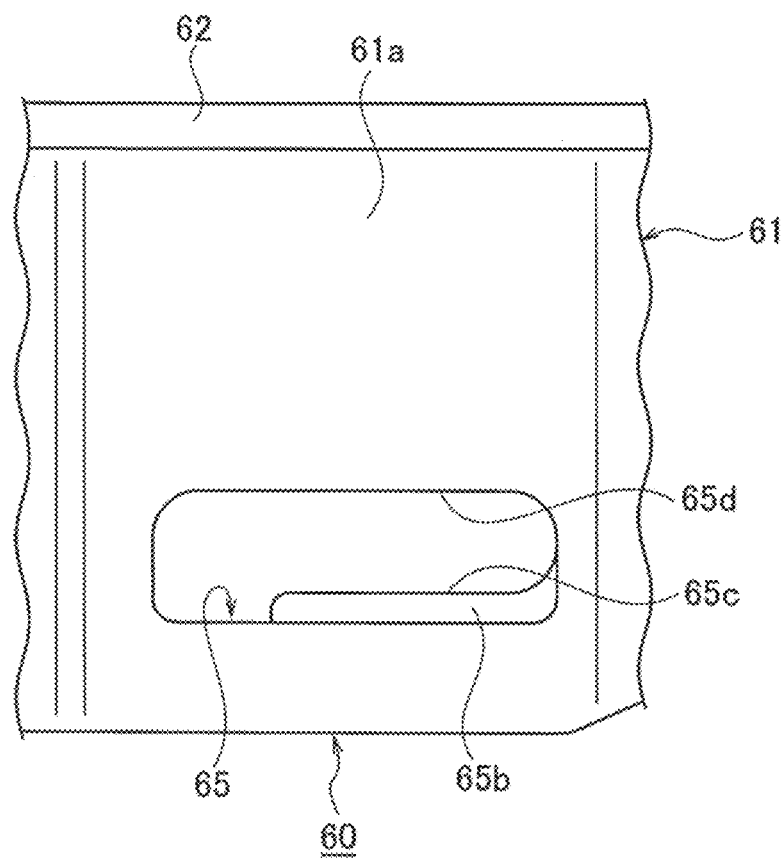
FIG. 9 is an enlarged side view around a cam groove of the frame.

As illustrated in FIGS. 8 and 9, cam grooves 65 and 65 with which the cam bosses 35 of the lever 30 are engaged, are formed on the opposite sides of the flange 62 at the center of the side walls 61a and 61a on both sides of the frame body 61, respectively. Each cam groove 65 includes the temporary locking projection 65a, the draw-in rib 65b, and a pushing-side sliding surface 65d. The temporary locking projection 65a is provided on the cam groove 65 side where an entrance is located. The draw-in rib 65b is formed with a drawn-in side sliding surface 65c extending in an L-shape from the temporary locking projection 65a. The pushing-side sliding surface 65d faces the drawn-in side sliding surface 65c of the draw-in rib 65b.

Figure 10:
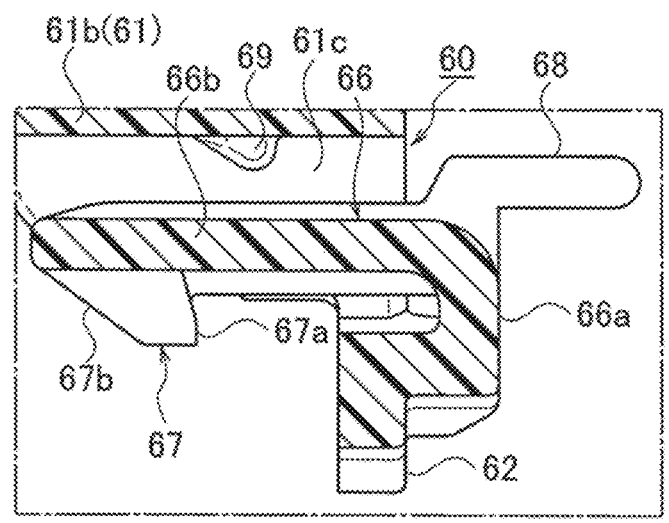
FIG. 10 is a cross-sectional view taken along a line X-X in FIG. 8.

As illustrated in FIGS. 8 and 10, a flexible arm 66 is provided between the abutting portions 61c and 61c of the bottom wall 61b of the frame body 61. The flexible arm 66 extends forward (in a direction perpendicular to the flange 62) and is flexibly deformed by being cantilevered by the flange 62. The flexible arm 66 includes a base portion 66a located at the rear of the flexible arm 66 (a side opposite to a side where the female connector 50 faces the male connector 20, that is, a side where the female housing 51 faces the grommet 70), and a distal end portion 66b located at the front of the flexible arm 66 (the side where the female connector 50 faces the male connector 20, that is, a side opposite to the side where the female housing 51 faces the grommet 70).

The base portion 66a is formed in a U-shape and is integrally formed with the flange 62. The distal end portion 66b extends in parallel with the bottom wall 61b of the frame body 61 with a gap from the bottom wall 61b. The locking projection 67 is formed on an outside of the distal end portion 66b integrally with the distal end portion 66b of the flexible arm 66 so as to protrude from the distal end portion 66b. The locking projection 67 is provided on the distal end portion 66b on a side opposite to a side facing the bottom wall 61b. The locking projection 67 is locked to the vehicle body panel 11 by sandwiching the vehicle body panel 11 between the locking projection 67 and the flange 62 via a waterproof lip 75 of the grommet 70, described later, as illustrated in FIG. 19. The locking projection 67 includes a locking surface 67a locked to the edge 12a of the mounting hole 12 of the vehicle body panel 11, and an inclined surface (taper) 67b for guiding into the mounting hole 12.

As illustrated in FIGS. 10 and 19, on the flexible arm 66 on a side where the base portion 66a is located, a rectangular plate-shaped sensing part 68 is formed integrally with the flexible arm 66 so as to protrude outward than the flange 62. The sensing part 68 senses whether or not the locking projection 67 is properly locked to the vehicle body panel 11. When the flexible arm 66 is flexed and deformed, the sensing part 68 swings up and down with a protrusion 69 provided on the bottom wall 61b of the frame body 61 as a fulcrum. With such a configuration, the sensing part 68 is displaced in conjunction with the locking projection 67. The sensing part 68 is covered with the grommet 70. Specifically, the sensing part 68 is housed in a receiving part 77 formed integrally with a panel contact part 71 of the grommet 70, described later. The sensing part 68 tilts together with the receiving part 77 of the grommet 70 in which the sensing part 68 is received.

Figure 11A:
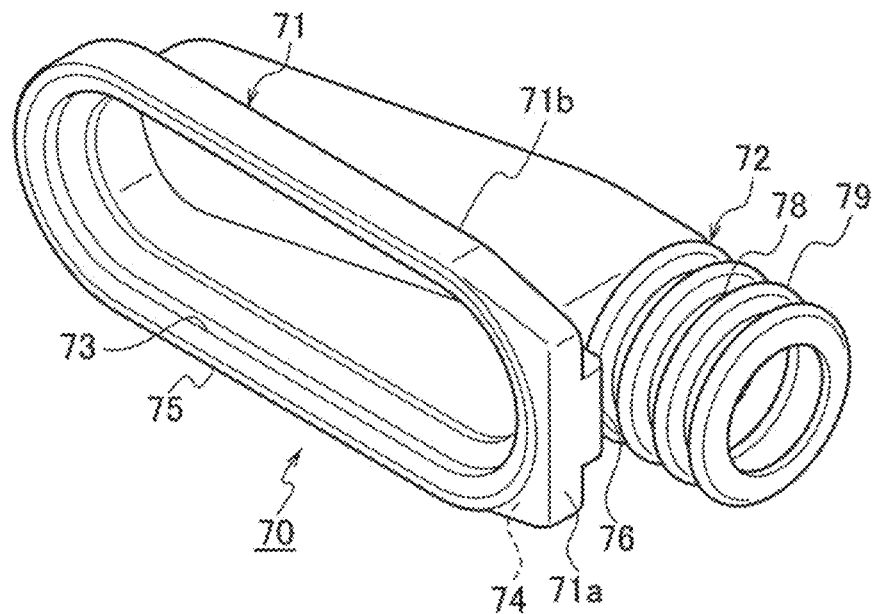
FIG. 11A is a perspective view of a grommet mounted on a flange of the frame as viewed from the front.
Figure 11B:
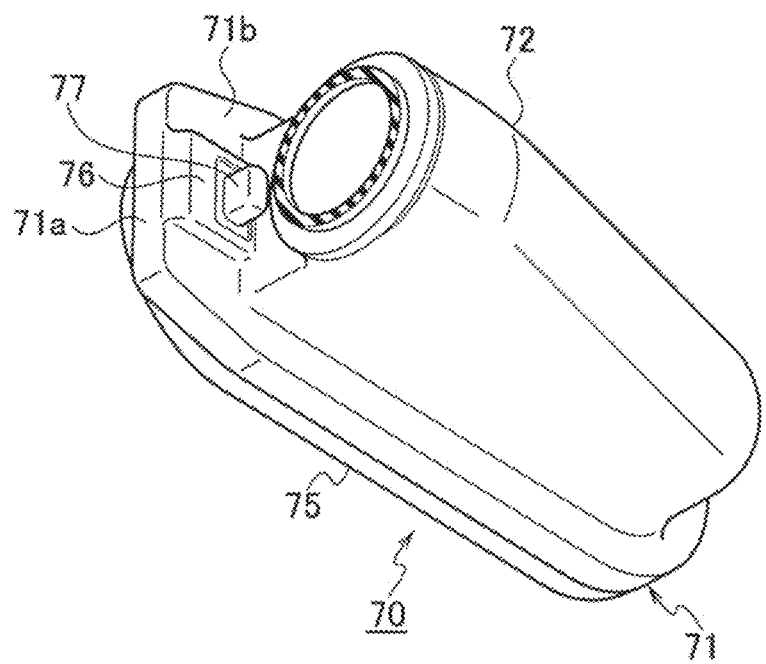
FIG. 11B is a perspective view of the grommet as viewed from the rear.

As illustrated in FIG. 1, FIG. 11A, and FIG. 11B, the grommet 70 includes the panel contact part 71 and a cable receiving part 72. The panel contact part 71 is fitted into the flange 62 so as to cover the flange 62. The panel contact part 71 comes into tight contact with the edge 12a of the mounting hole 12 of the vehicle body panel 11 when the female connector 50 is mounted on the vehicle body panel 11.

As illustrated in FIG. 11A, the flange fitting groove 73 is formed inside the panel contact part 71. The flange 62 is inserted into the flange fitting groove 73 over the entire circumference of the flange 62. The deep groove portion 74 is formed below the flange fitting groove 73. The projecting portions 62a and 62a of the flange 62 are inserted into the deep groove portion 74 without penetration. The waterproof lip 75 is integrally formed on an outside of the panel contact part 71. When attaching the female connector 50 to the vehicle body panel 11, the waterproof lip 75 is pressed against a wall surface 11a around the edge 12a of the mounting hole 12 of the vehicle body panel 11 and adheres to the edge 12a.

As illustrated in FIGS. 11A and 11B, a box portion 76 configured to house the base portion 66a of the flexible arm 66, is integrally formed so as to protrude from a bottom surface 71a of the panel contact part 71 to a back surface 71b. On the box portion 76, the receiving part 77 is formed so as to protrude integrally therewith. The sensing part 68 extending outward from the base portion 66a of the flexible arm 66 is received in the receiving part 77. The receiving part 77 is formed into a rectangular tube shape, and is formed into a curved and closed shape on an upper surface side thereof.

Figure 20:
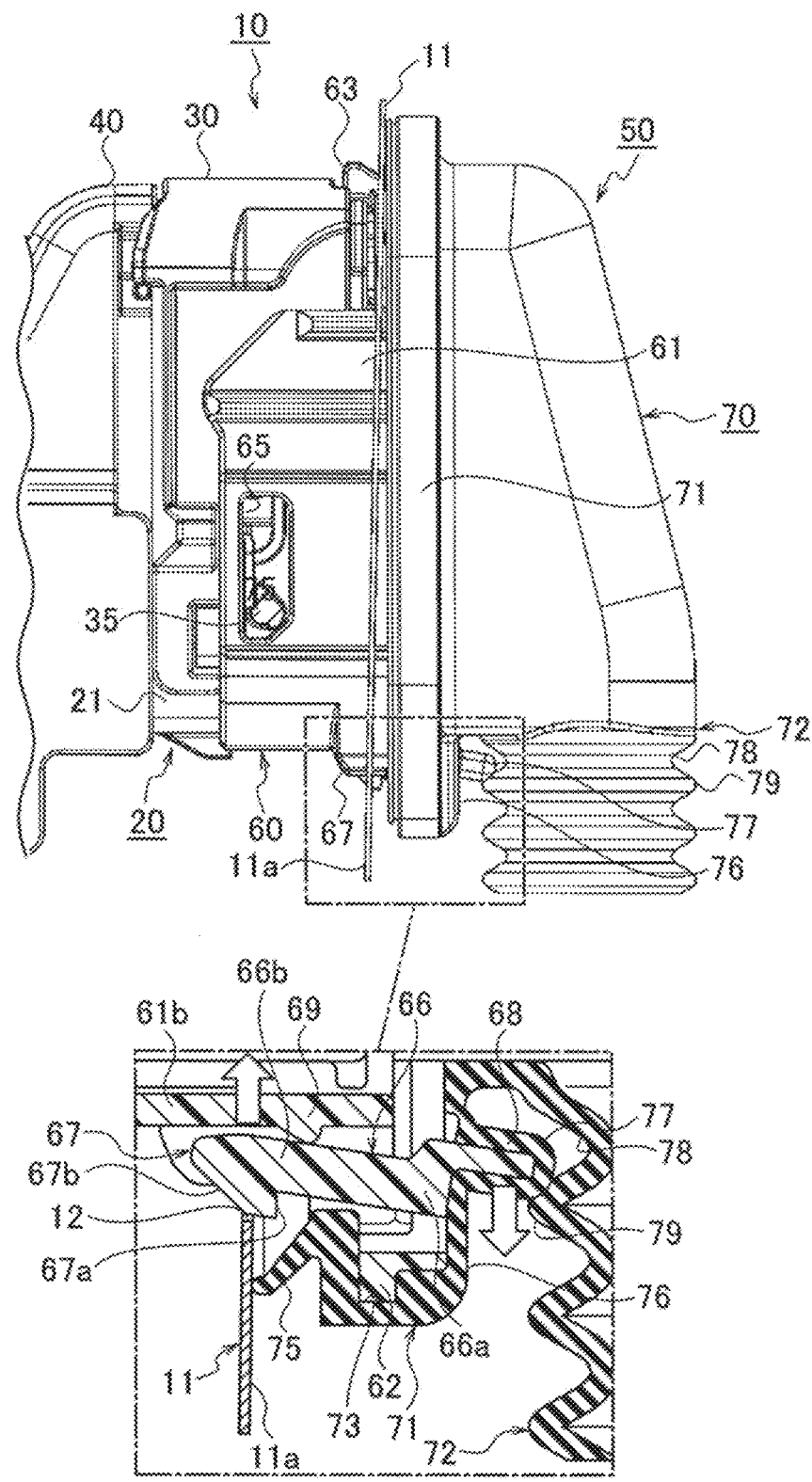
FIG. 20 is a side view illustrating a state in which the locking projection of the lever-type connector is half-locked to the vehicle body panel.

As illustrated in FIG. 19, in a locking completed state in which the locking projection 67 of the female housing 51 is properly locked to the vehicle body panel 11, the sensing part 68 and the receiving part 77 that receives the sensing part 68 are directed toward a valley 78 of bellows of the cable receiving part 72 of the grommet 70. As illustrated in FIG. 20, when the locking projection 67 is in a half-locked state in which the locking projection 67 is not locked to the vehicle body panel 11 properly, the sensing part 68 and the receiving part 77 that receives the sensing part 68 are directed toward a ridge 79 of the bellows of the cable receiving part 72 of the grommet 70. In this manner, it is possible to make sure the half-locked state and the locking completed state of the locking projection 67 can be confirmed based on whether or not the sensing part 68 and the receiving part 77 are tilted.

Figure 12:
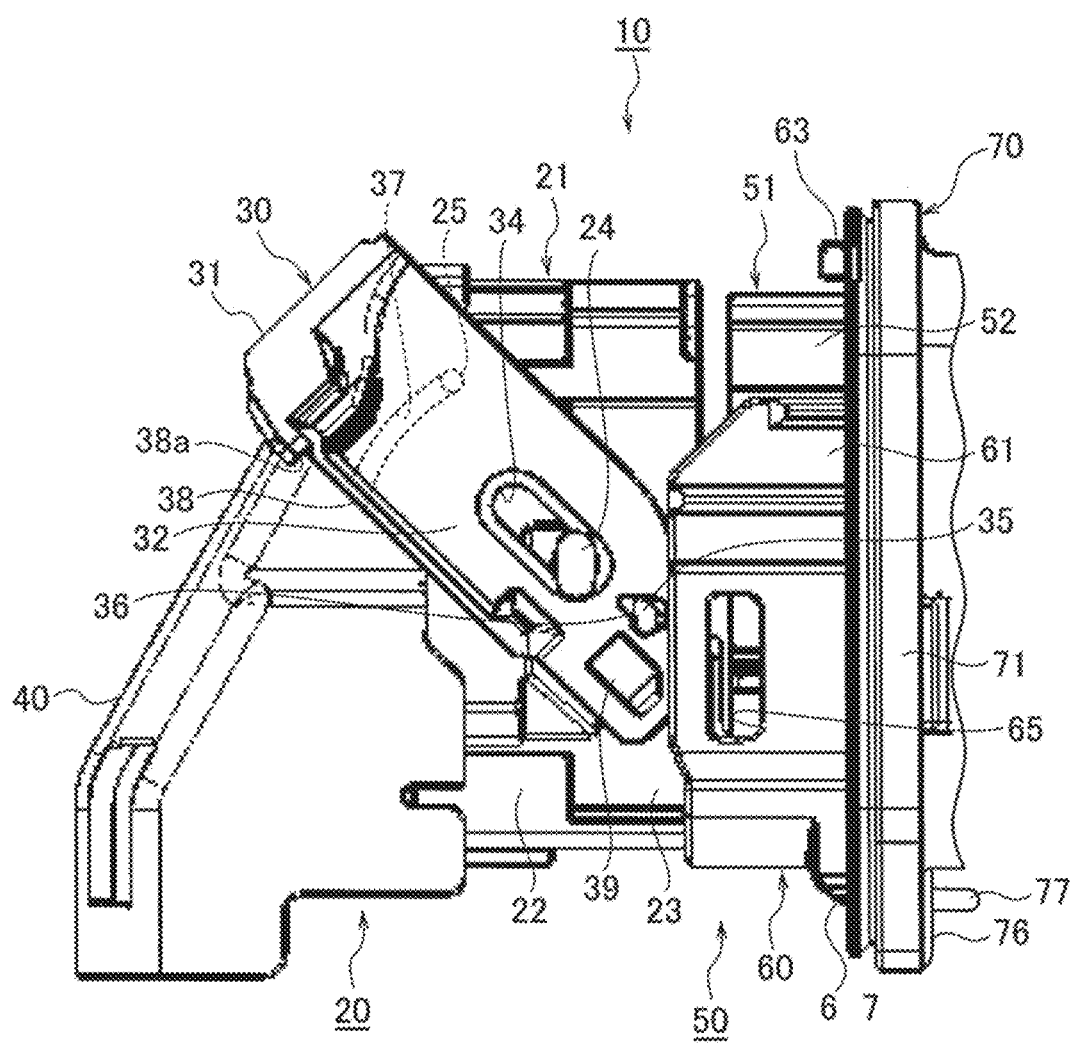
FIG. 12 is a side view illustrating a state before the temporary setting of the lever-type connector.

As described above, according to the lever-type connector 10 of the embodiment, before assembling the lever-type connector 10 to the mounting hole 12 of the vehicle body panel 11 (before temporary setting), the bearing holes 33 and 33 having the shaft sliding grooves 34 and 34 of the lever 30 are assembled to the support shafts 24 and 24 of the male housing 21 of the male connector 20, and the projecting portions 39a and 39a of the locking arms 39 and 39 of the lever 30 are temporarily locked to the temporary locking recesses 26 and 26 of the male housing 21 to maintain the temporary locking state of the lever 30 as illustrated in FIGS. 4 and 12 (it is noted that FIG. 12 illustrates one sides of the male connector 20 and the female connector 50). When the lever 30 is in the temporary locking state with respect to the male housing 21, the lever 30 is not allowed to pivot in the fitting direction between the male housing 21 and the female housing 51 of the female connector 50.

When the housing body 52 of the female housing 51 is pushed into the hood portion 23 of the male housing 21 in the temporary locking state of the lever 30, the release projections, not illustrated, of the housing body 52 cause the locking arms 39 and 39 of the lever 30 to be resiliently deformed outward. Accordingly, the temporary locking state of the temporary locking recesses 26 and 26 of the male housing 21 and the projecting portions 39a and 39a of the locking arms 39 and 39 of the lever 30 is released, and the lever 30 is allowed to pivot in the fitting direction between the male housing 21 and the female housing 51.

Next, as illustrated in FIG. 13A (it is noted that FIG. 13A illustrates one sides of the male connector 20 and the female connector 50), the male housing 21 and the female housing 51 are made face each other, and the cam bosses 35 and 35 of the lever 30 are inserted into the cam grooves 65 and 65 of the frame 60 of the female connector 50 to be locked to the temporary locking projections 65a and 65a formed at entrances of the cam grooves 65 and 65. The male housing 21 of the male connector 20 and the female housing 51 of the female connector 50 are brought into a temporary setting state by locking the cam bosses 35 and 35 of the lever 30 to the temporary locking projections 65a and 65a of the cam grooves 65 and 65. As illustrated in FIG. 13B, when releasing the temporary setting state, the male housing 21 is pulled out from the female housing 51 (pulled out in the temporary setting release direction R illustrated in FIG. 4), and the tapered portions 36a and 36a of the projections 36 and 36 provided on outsides of the cam bosses 35 and 35 slide over the temporary locking projections 65a and 65a of the cam grooves 65 and 65, so that the male connector 20 is smoothly disengaged from the female connector 50.

Next, as illustrated in FIG. 14A (it is noted that FIG. 14A illustrates one sides of the male connector 20 and the female connector 50), the lever 30 is pivoted around the support shafts 24 and 24 of the male housing 21 as a pivot axis, and the shaft portions 35a and 35a of the cam bosses 35 and 35 come into contact with the drawn-in side sliding surfaces 65c and 65c of the cam grooves 65 and 65, so that the female housing 51 is drawn inward. When the female housing 51 is drawn inward, the position control ribs 35b and 35b of the cam bosses 35 and 35 contact the draw-in ribs 65b and 65b of the cam grooves 65 and 65, so that contact between the shaft portions 35a and 35a of the cam bosses 35 and 35 and the drawn-in side sliding surfaces 65c and 65c of the cam grooves 65 and 65 is maintained.

At this time, the lever 30 pivots by the movement of the guide projections 25 and 25 of the male housing 21 along the arc-shaped guide grooves 37 and 37 of the lever 30 while the support shafts 24 and 24 of the male housing 21 are in sliding contact with the bearing holes 33 and 33 of the lever 30.

Next, as illustrated in FIG. 14A, when the pivot of the lever 30 is completed, the lever 30 is allowed to slide with respect to the male housing 21. That is, when the pivot of the lever 30 ends, the guide projections 25 and 25 of the male housing 21 come off the pickup tapers 37a and 37a formed at the open ends of the arc-shaped guide grooves 37 and 37 of the lever 30, so that the lever 30 is allowed to slide with respect to the male housing 21.

Then, as illustrated in FIG. 15 (it is noted that FIG. 15 illustrates one sides of the male connector 20 and the female connector 50), by pushing the operation portion 31 of the lever 30, the lever 30 is slid along the guide projections 25 and 25 of the male housing 21, and the projecting portions 39a and 39a of the locking arms 39 and 39 of the lever 30 are locked to the final locking recesses 27 and 27 of the male housing 21. In this case, the lever 30 is brought into a final locked state with respect to the male housing 21. When the lever 30 slides, the support shafts 24 and 24 of the male housing 21 slide on the shaft sliding grooves 34 and 34 of the lever 30. By inserting the lever 30 into the frame 60 of the female housing 51 by sliding the lever 30, the fitting between the male housing 21 and the female housing 51 is completed.

Next, a procedure for assembling the lever-type connector 10 in which the male connector 20 is fitted into the female connector 50 into the mounting hole 12 of the vehicle body panel 11 will be described with reference to FIGS. 16 to 19.

Figure 16:
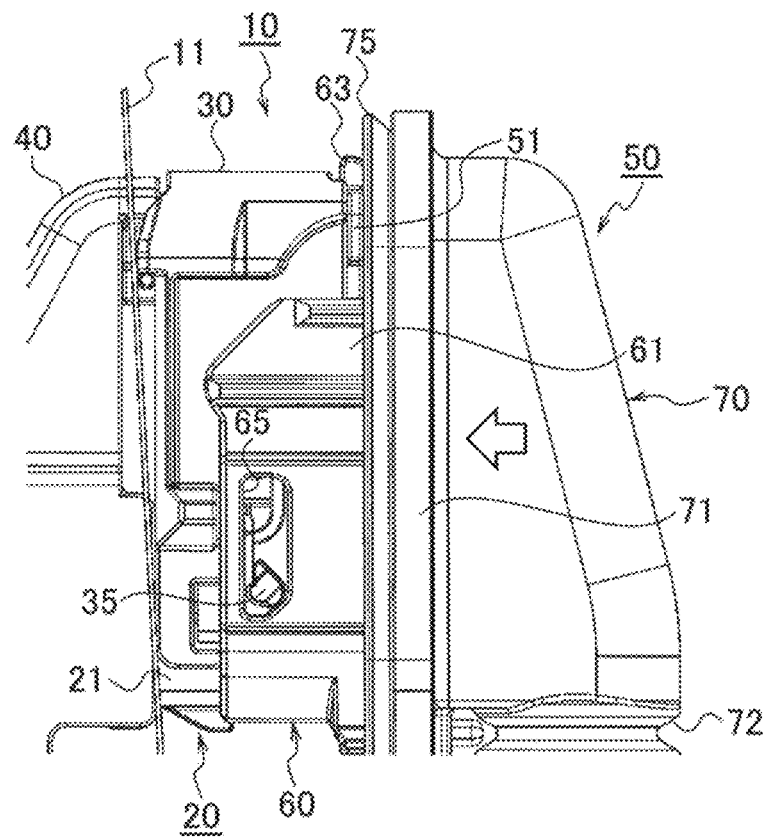
FIG. 16 is a side view illustrating a state in which the lever-type connector is passed through a mounting hole of a vehicle body panel.
Figure 17:
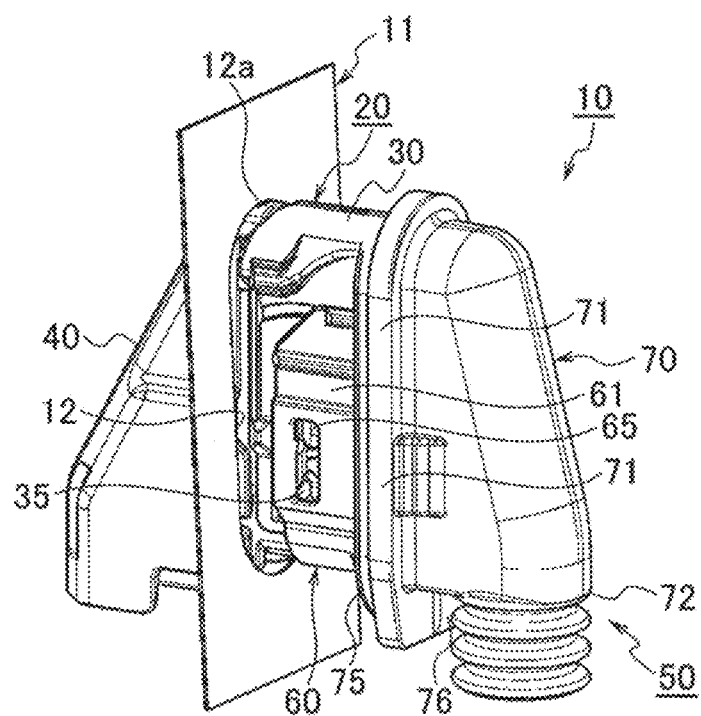
FIG. 17 is a perspective view illustrating the state in which the lever-type connector is passed through the mounting hole of the vehicle body panel.

As illustrated in FIGS. 16 and 17, the male connector 20 fitted into the female connector 50 is passed through the mounting hole 12 of the vehicle body panel 11 from a side where the door panel is located.

Figure 18:
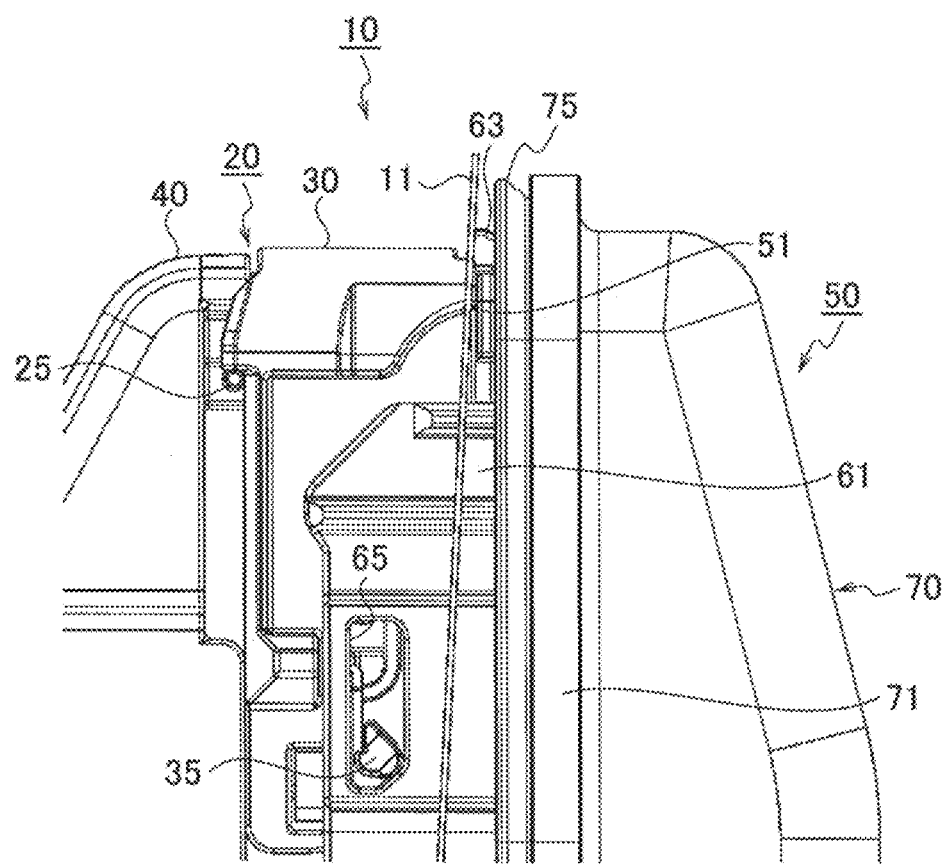
FIG. 18 is a side view illustrating a state in which a panel hooking portion of the lever-type connector is inserted into the mounting hole of the vehicle body panel.

Next, as illustrated in FIG. 18, the panel hooking portion 63 of the frame 60 of the female connector 50 starts to be inserted into the mounting hole 12 of the vehicle body panel 11.

Next, by further inserting the panel hooking portion 63 of the frame 60 into the mounting hole 12 of the vehicle body panel 11, the panel hooking portion 63 is locked to the edge 12a in a state in which the panel hooking portion 63 is hooked on the edge 12a of the mounting hole 12. In a state in which the panel hooking portion 63 is not hooked on the edge 12a of the mounting hole 12, the abutting portions 61c and 61c of the frame 60 come into contact with the wall surface 11a of the vehicle body panel 11, so that the locking projection 67 of the frame 60 is not locked to the edge 12a of the mounting hole 12 of the vehicle body panel 11.

Then, by making the female housing 51 pivot about the panel hooking portion 63 as a fulcrum in a state in which the panel hooking portion 63 of the frame 60 is hooked on the edge 12a of the mounting hole 12 of the vehicle body panel 11 as illustrated in FIG. 19, the inclined surface 67b of the locking projection 67 of the frame 60 comes into contact with the edge 12a of the mounting hole 12, and the flexible arm 66 provided with the locking projection 67 is vertically flexed, so that the locking projection 67 of the frame 60 is locked in the mounting hole 12 of the vehicle body panel 11. At this time, the waterproof lip 75 of the grommet 70 is pressed against the wall surface 11a of the vehicle body panel 11 without any gap, so that water can be prevented from entering through the mounting hole 12 of the vehicle body panel 11.

As illustrated in FIG. 19, in the locking completed state in which the locking projection 67 of the frame 60 is properly locked in the mounting hole 12 of the vehicle body panel 11, the sensing part 68 extending outward than the flexible arm 66 and the receiving part 77 of the grommet 70 in which the sensing part 68 is received, are positioned at a center of the valley 78 of the bellows of the cable receiving part 72 of the grommet 70. Accordingly, the operator can visually confirm the locking completed state of the locking projection 67. Furthermore, since the sensing part 68 is received in the receiving part 77 without penetration, it is possible to avoid deterioration of waterproof performance of the grommet 70.

On the other hand, as illustrated in FIG. 20, in the half-locked state in which the locking projection 67 of the frame 60 is not properly locked in the mounting hole 12 of the vehicle body panel 11 (for example, during locking), the locking projection 67 butts the mounting hole 12 of the vehicle body panel 11 and thus is lifted in a direction toward a bottom wall 61b of the frame 60. Consequently, the distal end portion 66b of the flexible arm 66 is brought into contact with the protrusion 69 of the bottom wall 61b of the frame 60 serving as a fulcrum. Simultaneously, the sensing part 68 extending outward than the flexible arm 66 and the receiving part 77 of the grommet 70 that receives the sensing part 68 are lowered, and comes into contact with the ridge 79 of the bellows of the cable receiving part 72 of the grommet 70. Accordingly, the operator can visually confirm the half-locked state of the locking projection 67.

In other words, when locking of the locking projection 67 is completed, the receiving part 77 of the grommet 70 receiving the sensing part 68 is located at a center of the valley 78 of the bellows of the cable receiving part 72 of the grommet 70. In contrast, when the locking projection 67 is half-locked, the receiving part 77 of the grommet 70 receiving the sensing part 68 comes into contact with the ridge 79 of the bellows of the cable receiving part 72 of the grommet 70. As described above, the states of the sensing part 68 and the receiving part 77 are different before and after the locking projection 67 is locked in the mounting hole 12 of the vehicle body panel 11. For this reason, the difference between the locking completed state and the half-locked state of the locking projection 67 is clear, and thus good visibility is provided. Therefore, the operator can visually confirm the locking completed state and the half-locked state of the locking projection 67 easily and reliably.

Figure 21:
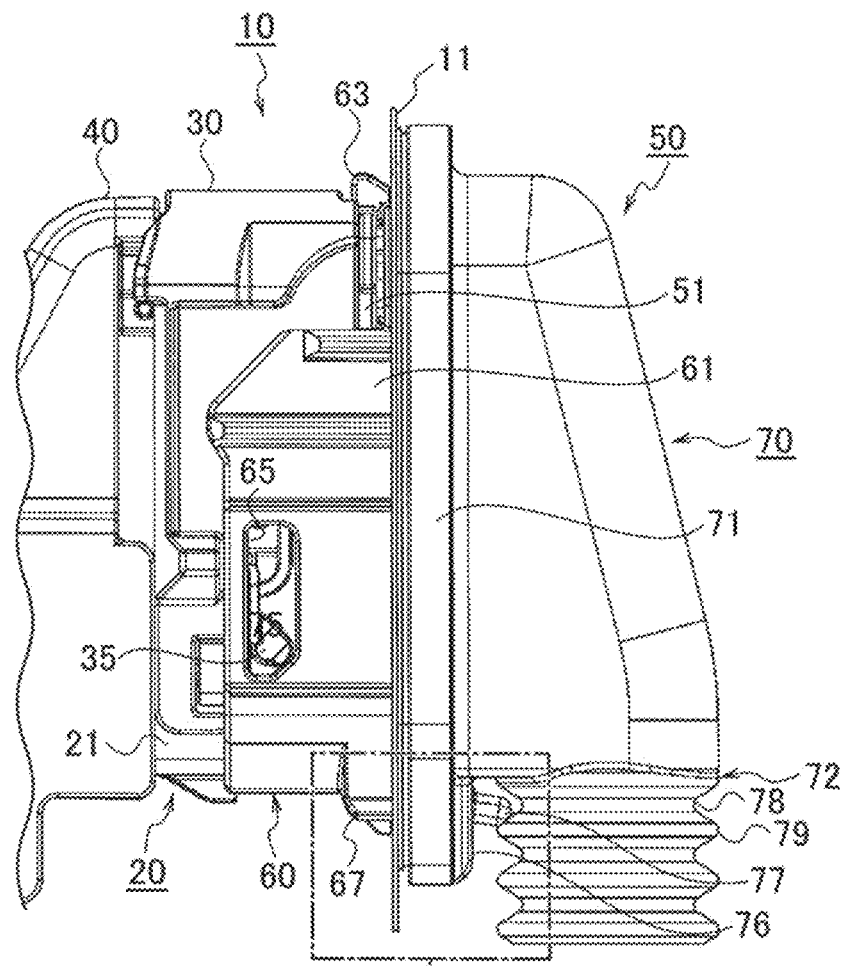
FIG. 21 is a side view illustrating a state in which the locking projection of the lever-type connector is released from the vehicle body panel.
Figure 21:
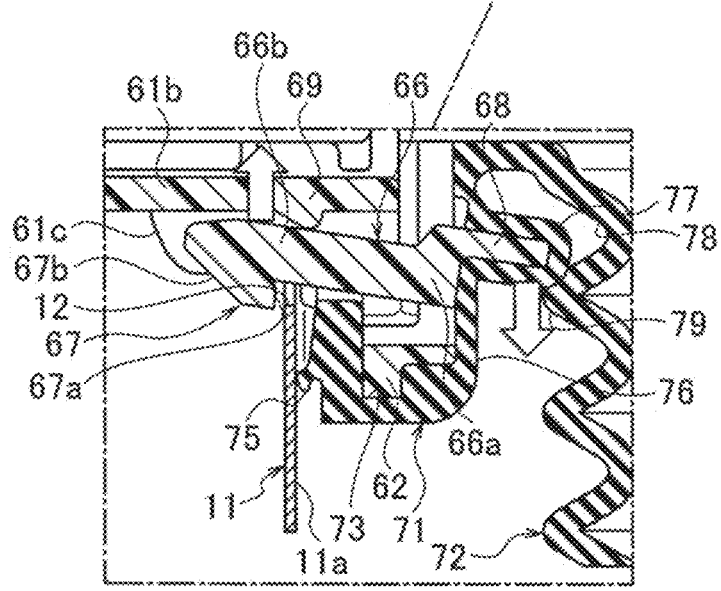
Figure 22:
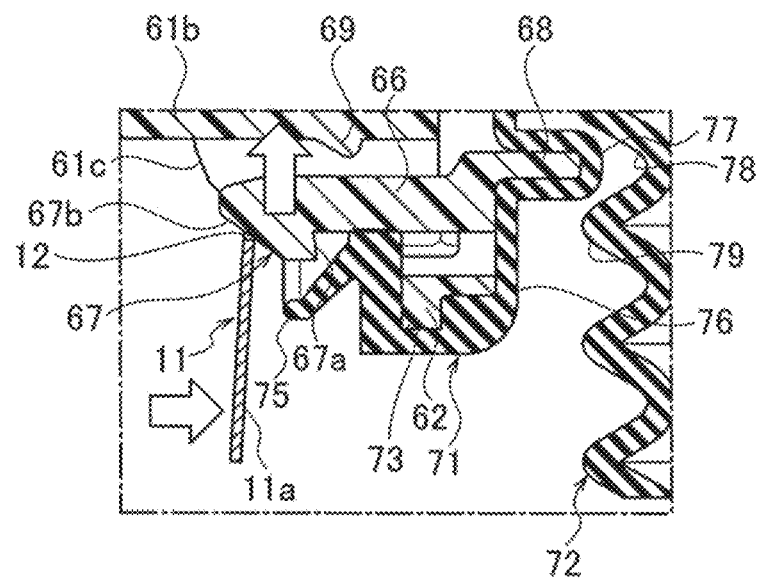
FIG. 22 is a partial cross-sectional view illustrating a state in which the locking projection of the lever-type connector has been released from the vehicle body panel.

As illustrated in FIGS. 21 and 22, when releasing the locked state of the locking projection 67 of the frame 60 with respect to the mounting hole 12 of the vehicle body panel 11, by pivoting the sensing part 68 and the receiving part 77 of the grommet 70 which receives the sensing part 68 downward with the protrusion 69 of the bottom wall 61b of the frame 60 as a fulcrum, the locking projection 67 is lifted in a direction toward the bottom wall 61b of the frame 60, and the engagement between the locking projection 67 and the mounting hole 12 is released. Further, since the sensing part 68 is housed in the bag-shaped receiving part 77 of the grommet 70, it is possible to sufficiently secure waterproofness.

Next, a comparative example will be described.

Figure 23:
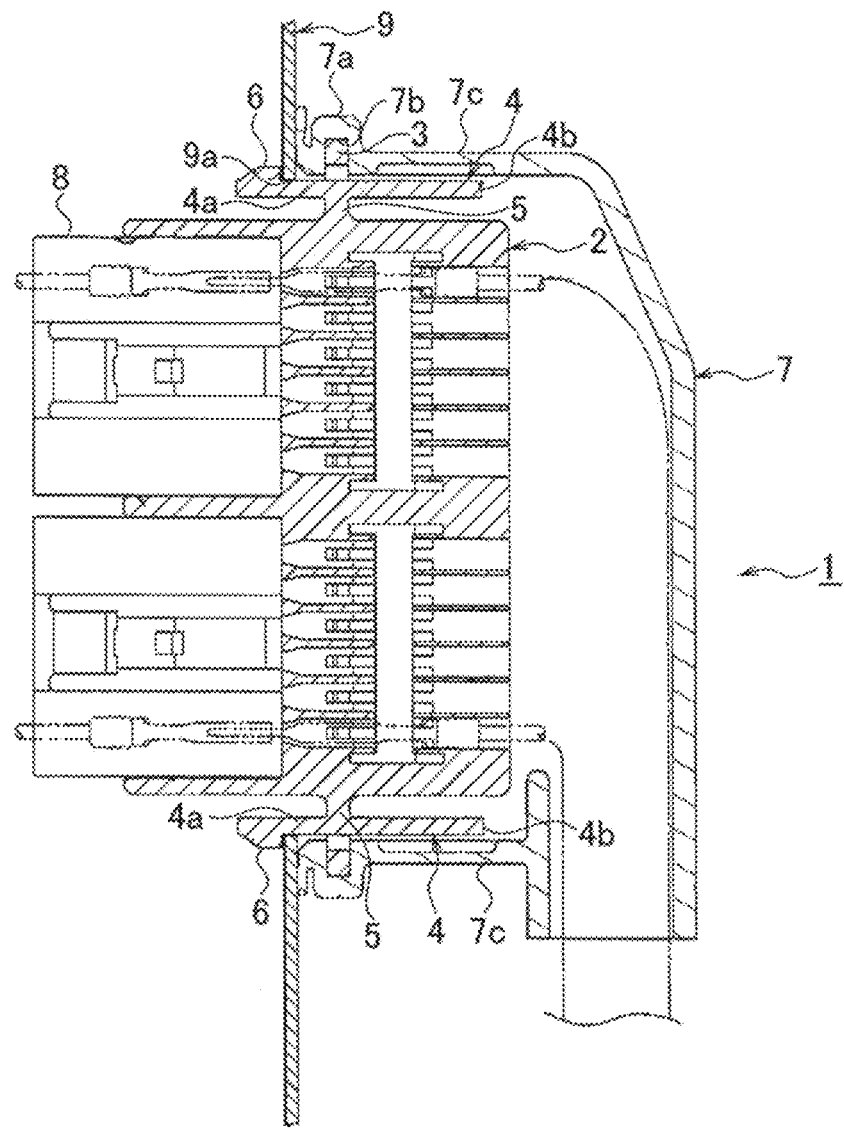
FIG. 23 is a cross-sectional view illustrating a state in which a connector housing of a connector with a grommet according to a comparative example is properly inserted into a mounting hole of a panel.
Figure 24:
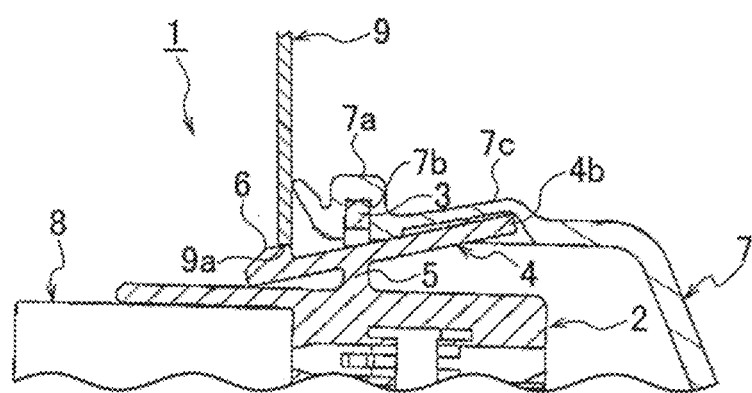
FIG. 24 is a partial cross-sectional view illustrating a state in which the connector housing of the connector with a grommet according to the comparative example is incompletely inserted into the mounting hole of the panel.

A connector 1 with a grommet according to the comparative example includes a connector housing 2 and a grommet 7 configured to cover an outer circumference of the connector housing 2 as illustrated in FIGS. 23 and 24. The connector housing 2 is mounted in a mounting hole 9a of a vehicle body panel (panel) 9 via a lock projection 6 (locking projection) thereof in a state in which the connector housing 2 is fitted into a mating connector housing 8. The grommet 7 includes a mounting portion 7a. The distal end portion of a flange part 3 of the connector housing 2 is fitted into a fitting groove 7b of the mounting portion 7a.

The flange part 3 includes a sensing piece 4 protruding in a front-rear direction via a fulcrum part 5. The sensing piece 4 includes an interference part 4a on the front side of the sensing piece 4 and includes a protruding part 4b on the rear side of the sensing piece 4. The interference part 4a includes a claw-shaped lock projection 6 protruding outward at the front end of the interference part 4a. The protruding part 4b presses a thin part 7c of the grommet 7 when the lock projection 6 is located in the mounting hole 9a.

As illustrated in FIG. 24, when the connector housing 2 is placed in an incompletely inserted state in the mounting hole 9a of the panel 9, that is, when the sensing piece 4 is still in a tilted state, and the lock projection 6 is in the mounting hole 9a, the protruding part 4b of the sensing piece 4 presses the thin part 7c of the grommet 7, and the thin part 7c of the grommet 7 bulges.

However, in the connector 1 with a grommet, when the connector housing 2 is placed in the incompletely inserted state in the mounting hole 9a of the panel 9, the sensing piece 4 in the tilted state is covered with the thin part 7c of the grommet 7. Therefore, it is difficult for an operator to visually confirm the state in which the thin part 7c of the grommet 7 is bulged.

As described above, in the connector 1 with a grommet, since the visibility of the sensing piece 4 is poor, the operator must touch the grommet 7 with the hand to confirm the bulging of the thin part 7c. In the case of a narrow work space, it is also difficult for an operator to touch the grommet 7 with the hand to confirm the bulging of the thin part 7c.

According to the present embodiment, the lever-type connector is assembled to the vehicle body panel after the male connector is fitted into the female connector. However, the disclosure is not limited thereto. For example, the male connector may be fitted into the female connector after assembling the female connector to the vehicle body panel.

According to the present embodiment, the female connector is constituted by the female housing and the frame, and the cam grooves are provided on the frame. However, the disclosure is not limited thereto. For example, the female connector may be constituted only by the female housing, and the female housing may be provided with the cam grooves.

Further, according to the present embodiment, the sensing part and the receiving part are directed toward the valley of the bellows of the cable receiving part of the grommet when the locking projection is properly locked to the vehicle body panel, and the sensing part and the receiving part is directed toward the ridge of the bellows of the cable receiving part of the grommet when the locking projection is not properly locked to the vehicle body panel. However, the disclosure is not limited thereto. For example, the sensing part and the receiving part may be configured to be directed toward the ridge of the bellows of the cable receiving part of the grommet when the locking projection is properly locked to the vehicle body panel, and the sensing part and the receiving part may be configured to be directed toward the valley of the bellows of the cable receiving part of the grommet when the locking projection is not properly locked to the vehicle body panel.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A connector with a grommet comprising:
a housing including a panel hooking portion that is hooked on an edge of a mounting hole of a panel and is locked to the edge, an annular flange that faces the edge, and a locking projection that is locked to the panel by sandwiching the panel between the locking projection and the flange, wherein the panel hooking portion, the flange, and the locking projection are formed on an outside of the housing; and
a grommet including a panel contact part that is fitted into the flange so as to cover the flange and comes into tight contact with the edge, wherein
a flexible arm extending forward is formed on the flange so as to protrude from the flange,
the locking projection is provided at a front of the flexible arm,
a sensing part configured to sense whether the locking projection is locked to the panel, is provided at a rear of the flexible arm so as to protrude outward than the flange,
the sensing part is always received in a receiving part formed on the panel contact part, and
the sensing part and the receiving part tilt when the locking projection is not locked to the panel.

2. The connector with a grommet according to claim 1, wherein
when the locking projection is locked to the panel, the sensing part and the receiving part are directed toward a valley of bellows of a cable receiving part of the grommet, and
when the locking projection is not locked to the panel, the sensing part and the receiving part are directed toward a ridge of the bellows of the cable receiving part of the grommet.

3. The connector with a grommet according to claim 1, wherein
the end of the sensing part comprises multiple sides of the sensing part, and
the multiple sides of the sensing part each directly contact the receiving part when the locking projection is locked to the panel.

4. A connector with a grommet comprising:
a housing including a panel hooking portion that is hooked on an edge of a mounting hole of a panel and is locked to the edge, an annular flange that faces the edge, and a locking projection that is locked to the panel by sandwiching the panel between the locking projection and the flange, wherein the panel hooking portion, the flange, and the locking projection are formed on an outside of the housing; and
a grommet including a panel contact part that is fitted into the flange so as to cover the flange and comes into tight contact with the edge, wherein
a flexible arm extending forward is formed on the flange so as to protrude from the flange,
the locking projection is provided at a front of the flexible arm,
a sensing part configured to sense whether the locking projection is locked to the panel, is provided at a rear of the flexible arm so as to protrude outward than the flange,
the sensing part is received in a receiving part formed on the panel contact part, and
the sensing part and the receiving part tilt when the locking projection is not locked to the panel.
when the locking projection is locked to the panel, the sensing part and the receiving part are directed toward a valley of bellows of a cable receiving part of the grommet, and
when the locking projection is not locked to the panel, the sensing part and the receiving part are directed toward a ridge of the bellows of the cable receiving part of the grommet.

* * * * *